United States Patent
Misra et al.

(10) Patent No.: US 9,502,055 B1
(45) Date of Patent: Nov. 22, 2016

(54) WRITE POLE SHIELD SHUNT

(71) Applicant: Seagate Technology LLC, Cupertino, CA (US)

(72) Inventors: Arkajyoti Misra, Chanhassen, MN (US); JianHua Xue, Maple Grove, MN (US); Eric S. Linville, Shakopee, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/701,137

(22) Filed: Apr. 30, 2015

(51) Int. Cl.
  *G11B 5/11* (2006.01)
  *G11B 5/31* (2006.01)
  *G11B 5/127* (2006.01)

(52) U.S. Cl.
  CPC ............ *G11B 5/315* (2013.01); *G11B 5/3116* (2013.01); *G11B 5/1278* (2013.01)

(58) Field of Classification Search
  CPC ...... G11B 5/3116; G11B 5/1278; G11B 5/11
  USPC ............................... 360/125.3, 128
  See application file for complete search history.

(56) References Cited

U.S. PATENT DOCUMENTS

| | | | |
|---|---|---|---|
| 5,075,956 A * | 12/1991 | Das | G11B 5/11 29/603.14 |
| 7,518,825 B2 | 4/2009 | Nishida et al. | |
| 7,639,450 B2 | 12/2009 | Hsu et al. | |
| 7,639,453 B2 | 12/2009 | Gill et al. | |
| 7,957,105 B2 | 6/2011 | Benakli | |
| 8,164,852 B2 * | 4/2012 | Lee | G11B 5/11 360/125.03 |
| 8,233,235 B2 | 7/2012 | Chen et al. | |
| 8,537,501 B2 * | 9/2013 | Benakli | G11B 5/3116 360/125.3 |
| 8,542,461 B2 | 9/2013 | Bai et al. | |
| 8,947,828 B1 * | 2/2015 | Hsiao | G11B 5/3116 29/603.16 |
| 2004/0012884 A1 * | 1/2004 | Sato | B82Y 10/00 360/123.51 |
| 2008/0019043 A1 * | 1/2008 | Toma | G11B 5/1278 360/110 |
| 2012/0063032 A1 * | 3/2012 | Meloche | G11B 5/1278 360/125.01 |
| 2013/0182352 A1 * | 7/2013 | Matsumoto | G11B 5/1278 360/234.3 |
| 2015/0228296 A1 * | 8/2015 | Taguchi | G11B 5/35 360/99.08 |

* cited by examiner

Primary Examiner — Will J Klimowicz

(57) ABSTRACT

A data storage device may have one or more data writers that are configured with at least one write pole and shield. The write pole and shield can each be positioned on an air bearing surface. The shield may have first and second protrusions each extending from a shield body towards the write pole with the first protrusion positioned on the air bearing surface and the second protrusion separated from the air bearing surface and first protrusion by a lateral notch.

18 Claims, 3 Drawing Sheets

WRITE POLE SHIELD SHUNT

SUMMARY

A data storage device has a data writer, in some embodiments, with a write pole and shield each positioned on an air bearing surface. The shield has first and second protrusions each extending from a shield body towards the write pole with the first protrusion positioned on the air bearing surface and the second protrusion separated from the air bearing surface and first protrusion by a lateral notch.

DETAILED DESCRIPTION

Progression of data storage devices towards higher data capacities and faster data access speeds has corresponded with tighter tolerances and smaller physical dimensions for data access components, like data writers and data readers. For example, a non-magnetic gap between a write pole of a data writer has been reduced to increase magnetic field gradients and allow the data writer to have a more precise resolution. However, close physical proximity of a write pole and a shield can result in unwanted magnetic shunting and shield saturation that degrades data writing performance by reducing useful magnetic flux and inducing magnetic volatility. Hence, there is an industry and consumer interest in mitigating data writing performance degradation associated with write pole-to-shield shunting.

As data storage devices have progressed, the non-magnetic gap between a write pole and a magnetic shield has steadily decreased. While a reduction of a front shield gap can increase magnetic field gradient and a reduction in a side shield gap can reduce erasure conditions, like adjacent track interference (ATI), reduced shield gaps can increase the risk of magnetic saturation of the shields. That is, magnetic flux intended for a soft underlayer (SUL) of an adjacent data storage medium can inadvertently form a closed flux loop through a magnetic shield, which reduces data writing performance and jeopardizes existing data due to the emission of flux from the shields that can erase unselected data bits. Thus, data writing performance can be optimized by increasing the flow of flux to the data storage medium instead of the data writer shields.

Accordingly, a data writer can be configured with a write pole proximal a shield on an air bearing surface (ABS) with the shield having first and second protrusions each extending from a shield body. By positioning the first protrusion on the ABS and the second protrusion distal the ABS and separated from the first protrusion by a lateral notch, the second protrusion acts as a shunt that provides a magnetic flux leakage path from the write pole away from the ABS, which increases magnetic field gradient at the ABS and optimizes data writer performance. The tuned size and position of the lateral notch and second protrusion can mitigate magnetic flux from leaking near the ABS without reducing useful magnetic flux transmitted by the write pole to an adjacent data storage medium to program data bits.

Figure 1:
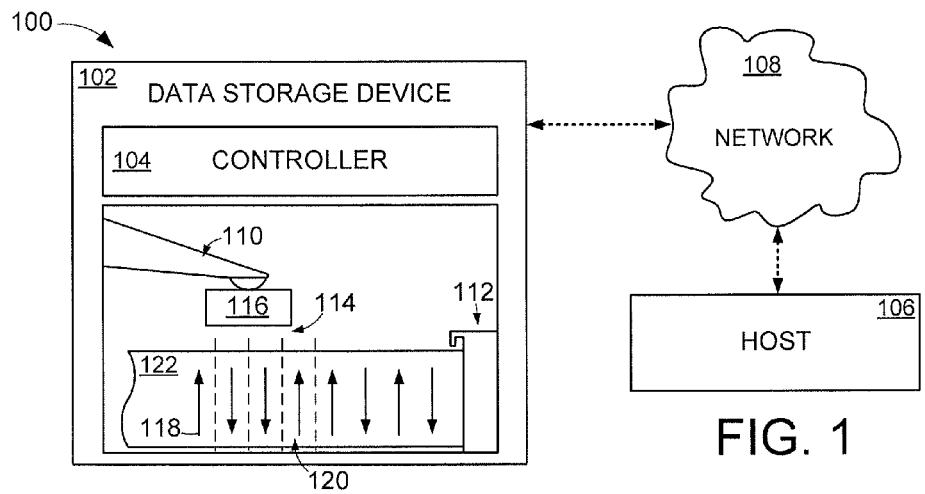
FIG. 1 is a block representation of a portion of an example data storage system configured in accordance with various embodiments.

While the various embodiments of the present disclosure are directed to a rotating hard disk drive data storage device, such an environment and system is not required or limiting as a shield shunt can be utilized in other data storage means, such as data readers, hybrid disk drives, and solid-state memory arrays. FIG. 1 is a block representation of a portion of an example data storage system 100 arranged in accordance with various embodiments to employ a data writer. The data storage system 100 can have any number of data storage devices 102, such as a hard disk drive and hybrid data storage device, that each have at least one local controller 104. The local controller 104 can communicate with one or more remote hosts 106, such as a server and/or node, via a wired or wireless network 108 to direct data access operations to and from the local data storage device 102.

Regardless of the complexity of data access control, data access operations can involve articulation of an actuator assembly 110 and spindle 112 to create an air bearing 114 on which a transducing head 116 flies to access selected data bits 118 and data track 120 portions of the data storage medium 122. In an effort to increase data capacity of the data storage device 102, the data bits 118 and data tracks 120 can have reduced size and increased density so that less non-magnetic material separates the data bits 118. Such increased data density corresponds with more precise magnetic resolution needed for data accessing components to access individual data bits.

Figure 2:
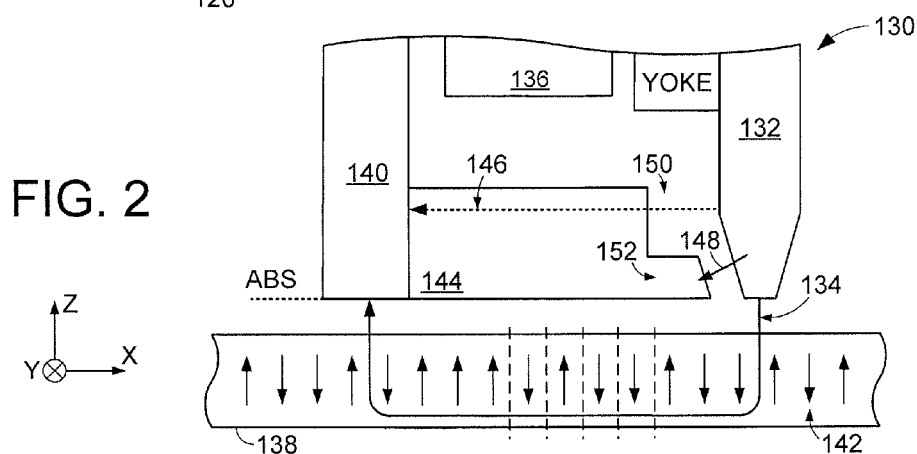
FIG. 2 illustrates a cross-sectional block representation of a portion of an example data writer configured in accordance with some embodiments.

FIG. 2 illustrates a cross-sectional block representation of a portion of an example data writer 130 constructed and operated with increased magnetic resolution in accordance with some embodiments. The data writer 130 has a main write pole 132 that is configured to direct magnetic flux 134 generated from a coil 136 into a data storage medium 138. The emanated magnetic flux 134 forms a magnetic circuit through the data storage medium 138 and to at least one return pole 140 to write a magnetic polarity to one or more data bits 142 on the data storage medium 138.

With the main write pole 132 and return pole 140 being close together, a shield 144 is positioned between the poles 132 and 140 to prevent magnetic flux 134 from circumventing the flux circuit pathway through the data storage medium 138, as shown by segmented line 146. Although positioning a trailing shield 144 downtrack from the main write pole 132 and uptrack from the return pole 140 can increase magnetic resolution of the data writer 130 at some form factors, small physical separation distances between the trailing shield 144 and the main write pole 132 can result in magnetic flux leakage, as displayed by line 148. Leakage of magnetic flux can degrade the data writing capabilities of the data writer 130 by reducing the amount of magnetic flux emanating towards the data storage medium 138 and available to form the magnetic circuit.

It is contemplated that the trailing shield 144 can be shaped to increase the amount of non-magnetic insulating material between the main write pole 132 and the trailing shield 144 distal the ABS, as shown by the shield notch 150 distal the ABS and protrusion 152 on the ABS. However, positioning the closest portion of the trailing shield 144 next to the write pole 132 at the ABS can localize flux leakage at the ABS, which can saturate the trailing shield 144 and inadvertently write, or erase, unselected data bits 142 adjacent to a selected data bit 142 that is intended to be written.

Figure 3:
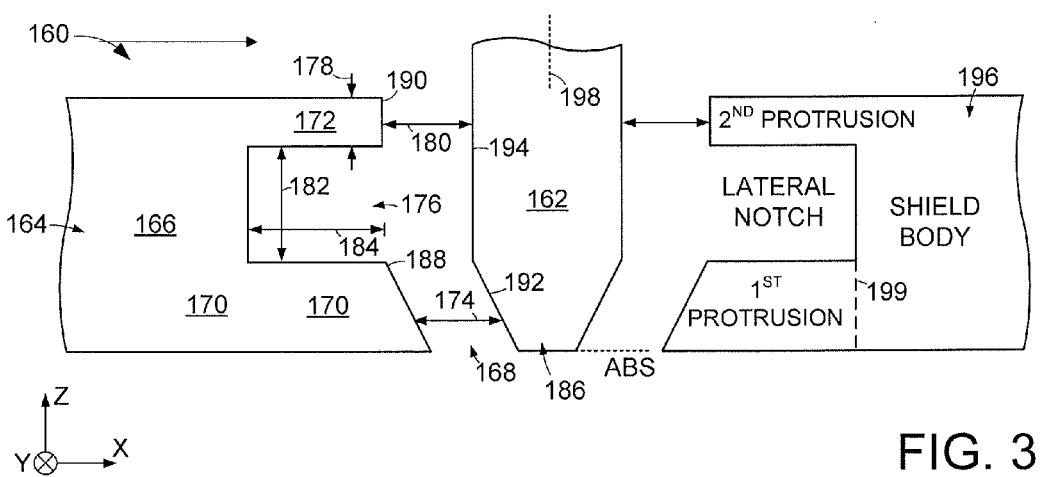
FIG. 3 shows a cross-sectional block representation of a portion of an example data writer arranged in accordance with various embodiments FIG. 4 displays a cross-sectional block representation of a portion of an example data writer configured in accordance with assorted embodiments.

With these issues in mind, a data writer can be configured with a shield proximal a write pole that provides a shunt distal the ABS to provide a more stable magnetic flux pathway to the adjacent data storage medium while increasing magnetic field gradient at the ABS. FIG. 3 is a side view block representation of a portion of an example data writer 160 arranged in accordance with various embodiments. Write pole 162 and trailing shield 164 portions of the data writer 160 are shown in FIG. 3, but can be incorporated as a magnetic shield and flux conduit anywhere in a data storage device, such as proximal a return pole or magnetoresistive reader.

It is noted that the terms "trailing" and "leading" are relative terms meant to convey the position of a component relative to the motion of the adjacent data storage medium. For example, a trailing shield will pass over a particular location on a data storage medium after a leading shield. Similarly, the terms "uptrack," "downtrack," and "crosstrack" are positional descriptions relative to the movement of a data track on the data storage medium. Thus, a trailing shield is downtrack from an uptrack write pole and leading shield.

In the trailing shield 164 shown in FIG. 3, a shield core 166 is a separated from the write pole 162 by a non-magnetic gap material 168 and is constructed as a solid piece of material. The shield core 166 is, in some embodiments, configured as a lamination of magnetic and non-magnetic materials while other embodiments construct the shield core 166 as a continuous layer of a single material, such as CoFe or NiFe alloys. The shield core 166 is not limited to a particular position relative to the write pole 162, but various embodiments position the shield core 166 so that first 170 and second 172 protrusions can each extend continuously towards the write pole 162 while maintaining at least a predetermined non-magnetic separation gap distance 174.

The first 170 and second 172 protrusions can be constructed of materials that are similar or dissimilar to each other and to the shield core 166. That is, the first protrusion 170 may be a different and magnetically softer material than the second protrusion 172 and different and magnetically harder material than the shield core 166. The ability to tune the materials of the core 166, first protrusion 170, and second protrusion 172 allows the shield 164 to provide a balance between magnetic shunting and magnetic shielding. In other words, the first protrusion 170 can be configured with a material conducive to shielding due to its position on the ABS while the second protrusion 172 is constructed with a material conducive to efficient magnetic shunting to allow any leakage magnetic flux from the write pole 162 to be conducted away from the ABS.

It is noted that configuring the trailing shield 164 with the second protrusion 172 cantilevered towards the write pole 162 provides a leakage flux path that can be characterized as a shunt. However, the second protrusion 172 is tuned for size, shape, and separation from the ABS and first protrusion 170 by a lateral notch 176 so that the second protrusion 172 does not unduly promote the leakage of magnetic flux from the write pole 162. For instance, the second protrusion 172 can be configured with a larger thickness 178, such as 150-250 nm, and larger separation gap distance 180 from the write pole 162, which can be defined by a square shaped notch defined by a length 182, such as 50-150 nm, and width 184, to give leaking flux a pathway away from the ABS, but not a conduit that promotes additional magnetic flux to flow away from the write pole tip 186.

It is contemplated that the lateral notch 176 is filled with a non-magnetic material, such as Alumina, or magnetic material that differs from the material of the protrusions 170 and 172 and/or shield core 166. The tuning of the lateral notch 176 can be complemented by tuning gap surfaces 188 and 190 of the respective protrusions 170 and 172 relative to the write pole 162. As shown, the gap surface 188 of the first protrusion 170 is angled with respect to the ABS to match a tapered write pole tip surface 192 and the gap surface 190 of the second protrusion 172 is perpendicular to the ABS in an orientation that matches the sidewall angle of the laterally adjacent write pole body surface 194. For the purposes of this disclosure, the term "lateral" is meant as along an axis or plane parallel to the ABS and Y axis.

Figure 4:
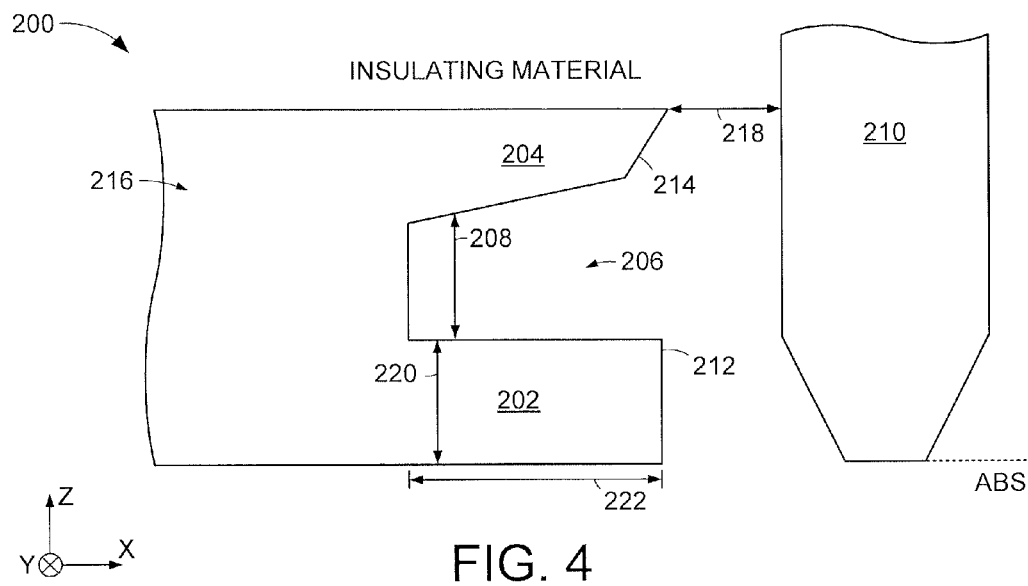

The gap surface 188 and 190 orientations can be manipulated to be continuously linear, curvilinear, stepped, and combinations thereof to control how the protrusions 170 and 172 interact with the write pole 162. FIG. 4 provides a side view block representation of a portion of an example data writer 200 that employs tuned shield protrusions 202 and 204 in accordance with some embodiments. Configuring the lateral notch 206 with a non-uniform length 208, the protrusions 202 and 204 each have larger cross-sectional areas along the Z-Y plane away from the write pole 210.

As illustrated by leading shield 196, the write pole 162 can be disposed between multiple shields on the ABS that have cantilevered protrusions separated by a lateral notch. It is contemplated that the leading 196 and trailing 164 shields can have matching configurations arranged symmetrical about the longitudinal axis 198 of the write pole 162. In some embodiments, the leading 196 and trailing 164 shields are configured to provide different cantilevered protrusions. For example, the leading shield 196 may have a single protrusion separated from the ABS by a lateral notch while the trailing shield has multiple protrusions, as shown by segmented line 199.

The non-limiting embodiment of FIG. 4 illustrates how the gap surfaces 212 and 214 can be dissimilar from the laterally adjacent portions of the write pole 210 to present a surface area that is less than the cross-sectional area of the protrusion away from the write pole 210. The combination of smaller gap surface 212 and 214 cross-sections and varying protrusion 202 and 204 cross-sections along the Y axis can provide two unique magnetic profiles for the respective protrusions 202 and 204.

It can be appreciated from the shield 164 of FIG. 3 and shield 216 of FIG. 4 that the cantilevered protrusions extending towards the write pole can be tuned for material, position, shape, and size to provide optimal and concurrent shielding on the ABS and flux leakage shunting distal the ABS. In some embodiments, the second protrusion 204 is separated from the ABS by a predetermined distance, such as 235 nm, that can be more than, or less than, the gap distance 218 between the gap surface 214 and the write pole 210. In other embodiments, the first protrusion 202 has a greater thickness 220, such as 150-250 nm, throughout its width 222 compared to the second protrusion 204, which can provide increased shielding and amounts of magnetic material on the ABS.

Figure 5:
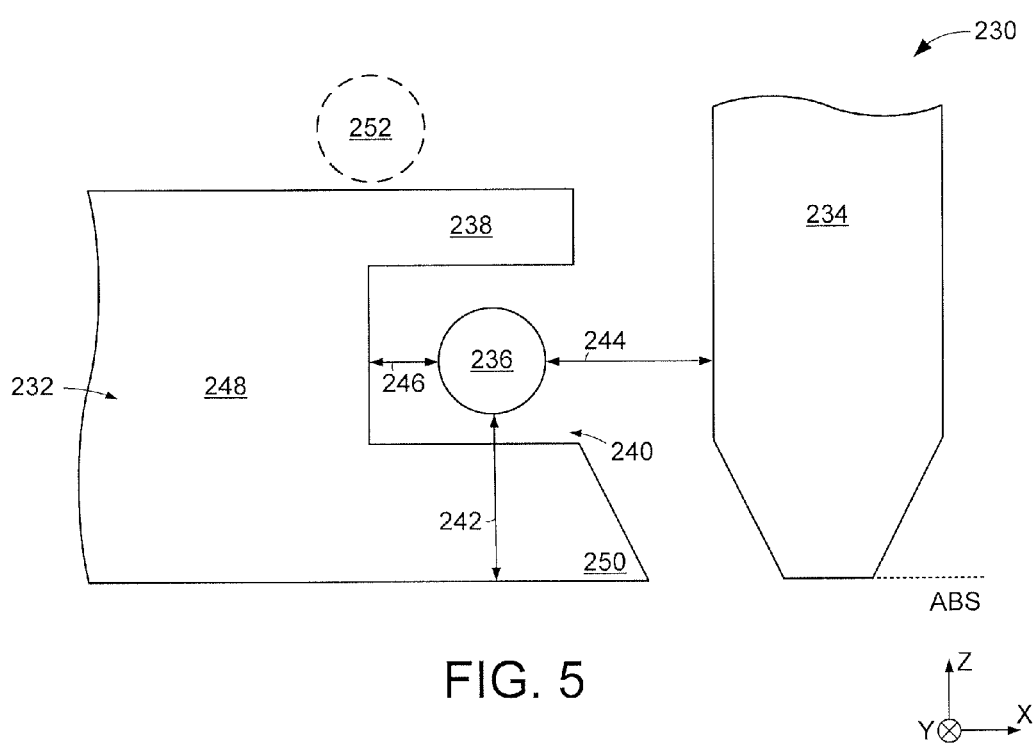
FIG. 5 provides a cross-sectional block representation of a portion of an example data writer constructed and operated in accordance with some embodiments.

Configuring the lateral notch 206 and protrusions 202 and 204 to provide shielding at the ABS and an efficient shunt pathway distal the ABS may be characterized as passive due to its sole reactivity to encountered magnetic flux from the write pole 210 and stray magnetic fields distal the write pole 206. FIG. 5 displays a side view block representation of a portion of an example data writer 230 arranged with an active shield 232 positioned on the ABS and separated from the write pole 234 in accordance with some embodiments. The shield 232 has a current source 236, which can be, but is not limited to, a wire connected to a write coil portion of the write pole 234. The current source 236 can be positioned anywhere in and around the shield 232 to energize the magnetic material of the shield 232 to proactively increase the magnetization of the shield 232 to optimize data writer 230 shielding and data writing performance.

The current source 236 may be wrapped around portions of the shield 232, such as the second protrusion 238, to continuously extend in and through a lateral notch 240 region. It is contemplated that the incorporation of the current source 236 into the lateral notch 240 region can correspond with the lateral notch 240 being open to air. That is, the current source 236 can take the place of filling the lateral notch 240 with magnetic or non-magnetic material. However, some embodiments can partially or completely fill the lateral notch 240 with magnetic and/or non-magnetic material with the current source 236 present in the lateral notch 240.

The position of the current source 236 may be tuned for distance 242 from the ABS, distance 244 from the write pole 234, and distance 246 from the shield core 248 to provide different active shielding and shunt pathway magnetic profiles in the shield 232. The active nature of passing current through the current source 236 irrespective of the position of the write pole 234 relative to encountered data bits allows the shield 234 to mitigate flux leakage and ABS shielding of stray magnetic fields. In a non-limiting embodiment, the current source 236 is positioned half way between the first 250 and second 238 protrusions and activated only when data writing operations are conducted to energize the shield core 248 and protrusions 238 and 250 in the presence of magnetic flux passing through the write pole 234.

It is contemplated that multiple different current sources from different current generators are positioned about the shield 232, as illustrated by segmented line 252. For example, a first current source is positioned in the lateral notch 240 and a second current source is positioned proximal the shield core 248, distal the ABS, which allows the shield core 248 and protrusions 238 and 250 to be selectively activated with different timing and amounts of current. The use of multiple different current sources can complement configuring the protrusions 238 and 250 differently. That is, multiple different current sources can be positioned and operated in different manners to complement the tuned size, shape, and material of the shield core 248 and protrusions 238 and 250.

Figure 6:
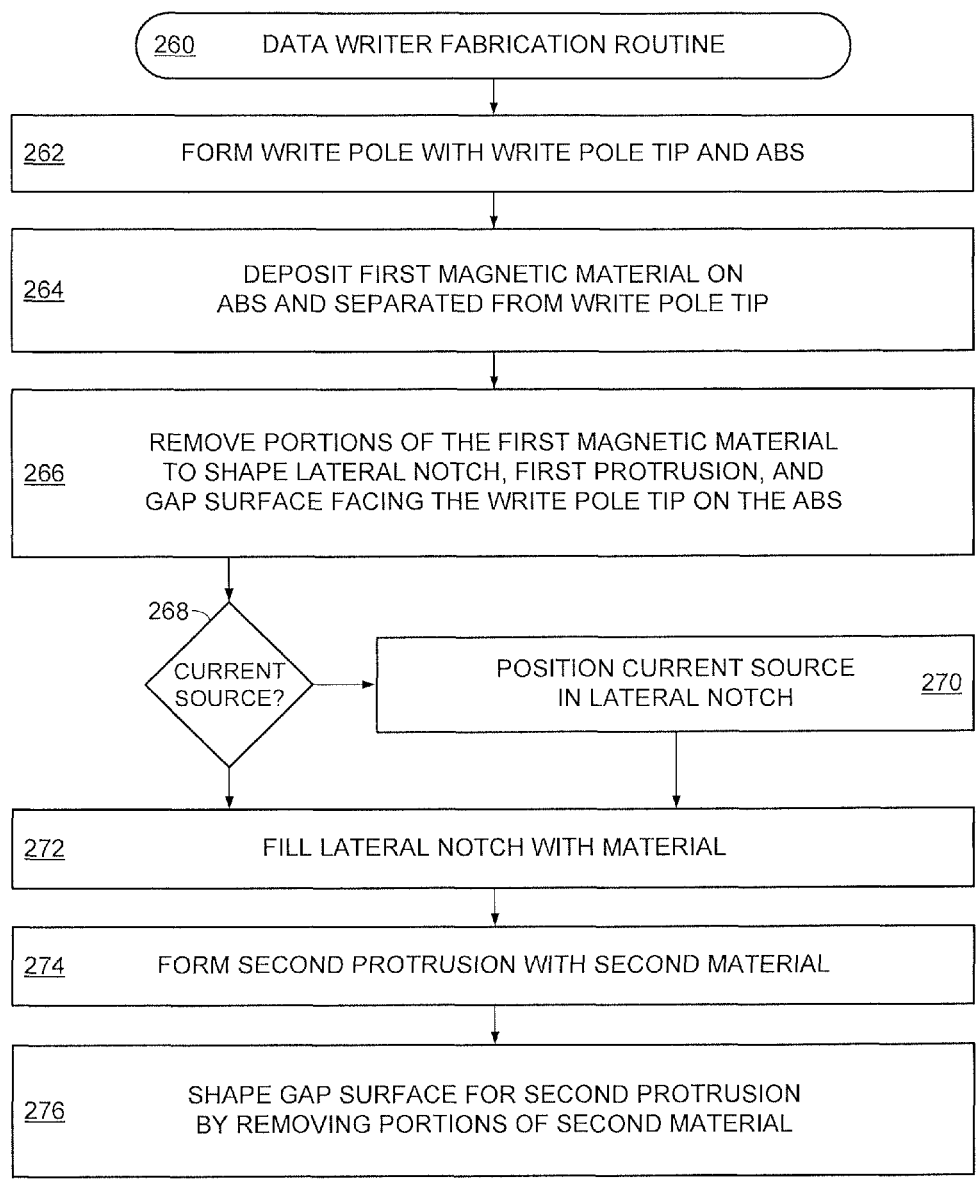
FIG. 6 is a flowchart of an example data writer fabrication routine carried out in accordance with various embodiments.

FIG. 6 is a flowchart of an example data writer fabrication routine 260 that may be carried out in accordance with various embodiments. The routine 240 begins by forming a write pole to continuously extend away from an ABS with a write pole tip in step 262. A shield is subsequently initiated in step 264 by depositing a first magnetic material proximal the write pole. A portion of the first magnetic material is removed in step 266 to form the size and shape of the lateral notch as well as the first protrusion cantilevered on the ABS. In some embodiments, the first protrusion has a thickness of 60 nm, as measured perpendicular to the ABS, and the lateral notch has a thickness of 200-250 nm, as measured perpendicular to the ABS. The removal of material in step 266 can also shape a gap surface of the first protrusion, which may reflect the embodiments discussed in FIG. 4.

Decision 268 evaluates if one or more current source(s) are to be incorporated into the lateral notch. If a current source is chosen, step 270 positions at least one current source in the lateral notch. In the event no current source is to be positioned n the lateral notch, or at the conclusion of step 270, step 272 fills the lateral notch region with one or more magnetic and/or non-magnetic materials that may form a gap surface facing the write pole that matches, or is dissimilar to, the immediately adjacent write pole sidewall shape. A second protrusion is formed atop the lateral notch in step 274 and may involve a material that is the same as or different than the material of the shield core and first protrusion. A second protrusion gap surface may be formed in step 276 by removing portions of the second protrusion material, but step 274 is not required and the second protrusion gap surface may remain as formed without further shaping.

It is contemplated that any number of steps and decisions can be added to routine 260 without limitation. For example, a current source may be positioned outside of the lateral notch and a return write pole may be formed downtrack from the write pole of step 262. The various aspects of routine 260 can be changed without limitation to add, remove, and omit any step and/or decision.

Through the various tuned embodiments for a shield positioned proximal a write pole, an efficient leakage flux pathway is provided that mitigates magnetic volatility at the ABS. The tuned shape, size, and material of the shield to provide separate first and second cantilevered protrusions respectively positioned on and distal to the ABS allows concurrent shielding of stray magnetic fields on the ABS while providing a more efficient magnetic flux path through the write pole due to leakage flux passing to the second protrusion distal the ABS. While it is understood that the leakage flux pathway provided by the second protrusion can reduce the amount of magnetic flux passing through the write pole to the ABS, the localizing of leakage flux away from the ABS can provide write field gradients conducive to data storage environments with high data densities.

It is noted that there may be no practical increase in magnetic flux flowing from the write pole to the data storage medium in a quasi-static state of the data writer where flux paths have been established. That is, the various shield embodiments can optimize the establishment of a magnetic flux loop from the write pole and the data medium, such as during a magnetic switching event. Without the assorted shield embodiments, bursts of flux can propagate through one or more shields, which increases the risk of erasure conditions on track and on adjacent side tracks.

While the embodiments have been directed to magnetic programming, it will be appreciated that the claimed technology can readily be utilized in any number of other applications, such as data reading sensors. It is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. An apparatus comprising a write pole and shield each positioned on an air bearing surface (ABS), the shield having first and second protrusions each extending from a shield body towards the write pole and each separated from the write pole by at least a predetermined distance, the first protrusion positioned on the ABS and continuously extending from the shield body by a greater width than the second protrusion as measured parallel to the ABS, the second protrusion separated from the ABS and first protrusion by a lateral notch.

2. The apparatus of claim 1, wherein the first protrusion terminates at a first end surface and the second protrusion terminates at a second end surface.

3. The apparatus of claim 2, wherein the first and second end surfaces respectively form different angles with respect to the ABS.

4. The apparatus of claim 2, wherein the first end surface is angled at a non-normal angle with respect to the ABS to match a write pole tip surface of the write pole.

5. The apparatus of claim 2, wherein the second end surface is angled to match a write pole body surface of the write pole.

6. The apparatus of claim 1, wherein the first protrusion has a uniform thickness from the shield body to a first gap surface, the uniform thickness being greater than any thickness of the second protrusion from the shield body to a second gap surface, each thickness measured perpendicular to the ABS.

7. The apparatus of claim 1, wherein the lateral notch has a notch thickness that is greater than a first thickness of the first protrusion and a second thickness of the second protrusion, each thickness measured perpendicular to the ABS.

8. The apparatus of claim 1, wherein at least one protrusion has a non-uniform thickness along an axis parallel to the ABS.

9. The apparatus of claim 1, wherein the lateral notch has a square shape.

10. The apparatus of claim 1, wherein a single wire of a first current source is positioned in the lateral notch and a second wire of a second current source is positioned outside the lateral notch and distal the ABS.

11. The apparatus of claim 1, wherein the first protrusion comprises a different material than the second protrusion.

12. The apparatus of claim 1, wherein the first protrusion is magnetically softer than the second protrusion.

13. The apparatus of claim 1, wherein no portion of the shield contacts the write pole.

14. An apparatus comprising a write pole continuously extending from an air bearing surface (ABS) and a trailing shield positioned on the ABS, the trailing shield having first and second protrusions each continuously extending from a shield body towards the write pole and each separated from the write pole by at least a predetermined distance, the first protrusion positioned on the ABS and separated from the second protrusion by a first lateral notch, a single wire of a first current source positioned in the first lateral notch, half-way between the first and second protrusions, the second protrusion separated from the ABS by the first lateral notch and first protrusion along an axis parallel to a longitudinal axis of the write pole.

15. The apparatus of claim 14, wherein the single wire of the first current source is positioned closer to the shield body than to the write pole.

16. The apparatus of claim 14, wherein a second wire of a second current source is positioned proximal the second protrusion and separated from the first lateral notch.

17. A method comprising:
    positioning a write pole and shield each on an air bearing surface (ABS), the shield having first and second protrusions each extending from a shield body towards the write pole and each separated from the write pole by at least a predetermined distance, the first protrusion positioned on the ABS and continuously extending from the shield body by a greater width than the second protrusion as measured parallel to the ABS, the second protrusion separated from the ABS and first protrusion by a lateral notch; and
    directing magnetic flux from the write pole into the second protrusion instead of the first protrusion.

18. The method of claim 17, wherein a data writing flux loop is established between the write pole and an adjacent data storage medium while the magnetic flux is directed to the second protrusion.

* * * * *